United States Patent
Chen

(10) Patent No.: US 11,861,933 B2
(45) Date of Patent: Jan. 2, 2024

(54) TOUCH-BASED METHOD FOR USER AUTHENTICATION

(71) Applicants: Inventec (Pudong) Technology Corporation, Shanghai (CN); INVENTEC CORPORATION, Taipei (TW)

(72) Inventor: Trista Pei-Chun Chen, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 202 days.

(21) Appl. No.: 17/547,403

(22) Filed: Dec. 10, 2021

(65) Prior Publication Data

US 2023/0078398 A1  Mar. 16, 2023

(30) Foreign Application Priority Data

Sep. 14, 2021 (CN) .......................... 202111084089.0

(51) Int. Cl.
*G06F 21/00* (2013.01)
*G06V 40/12* (2022.01)
*G06F 21/32* (2013.01)

(52) U.S. Cl.
CPC .......... *G06V 40/1347* (2022.01); *G06F 21/32* (2013.01); *G06F 2218/12* (2023.01)

(58) Field of Classification Search
CPC .. G06V 40/1347; G06V 10/774; G06V 10/82; G06V 40/13; G06F 21/32; G06F 2218/12; G06F 18/22; G06F 21/316
See application file for complete search history.

(56) References Cited

U.S. PATENT DOCUMENTS

| | | | |
|---|---|---|---|
| 2003/0046072 A1* | 3/2003 | Ramaswamy | G10L 17/02 704/240 |
| 2013/0219490 A1* | 8/2013 | Isbister | G06F 21/32 726/19 |
| 2015/0371023 A1* | 12/2015 | Chen | G06F 21/316 726/17 |
| 2016/0239649 A1* | 8/2016 | Zhao | H04W 12/065 |
| 2018/0004924 A1* | 1/2018 | Tieu | G06F 21/6218 |
| 2019/0197218 A1* | 6/2019 | Schwartz | G06F 21/316 |
| 2020/0275271 A1* | 8/2020 | Saripalle | H04W 12/065 |
| 2022/0350869 A1* | 11/2022 | Progonov | G06F 11/3051 |

* cited by examiner

*Primary Examiner* — Jeffrey C Pwu
*Assistant Examiner* — William A Corum, Jr.
(74) *Attorney, Agent, or Firm* — Locke Lord LLP; Tim Tingkang Xia, Esq.

(57) ABSTRACT

A touch-based method for user authentication includes a training stage and an authentication stage. The training stage includes: generating, by a touch interface, a plurality of training touch parameters; and generating, by a processor, a training heat map according to the plurality of training touch parameters. The authentication stage includes: generating, by the touch interface, a plurality of testing touch parameters; generating, by the processor, a testing heat map according to the plurality of testing touch parameters; comparing, by the processor, the testing heat map with the training heat map to generate an error map; and generating, by the processor, one of pass signal and fail signal according to the error map.

3 Claims, 13 Drawing Sheets

TOUCH-BASED METHOD FOR USER AUTHENTICATION

CROSS-REFERENCE TO RELATED APPLICATIONS

This non-provisional application claims priority under 35 U.S.C. § 119(a) on Patent Application No(s). 202111084089.0 filed in China on Sep. 14, 2021, the entire contents of which are hereby incorporated by reference.

BACKGROUND

1. Technical Field

The present disclosure relates to user authentication, and more particularly, to a touch-based method for user authentication.

2. Related Art

User authentication is a process that allows a computing device (e.g. a laptop computer or smartphone) to verify the identity of person who tries to use this computing device. The result of the user authentication process is a binary result indicating "pass" or "fail". The result "pass" means the unknown user is genuine, who is indeed who he/she claims to be, while the result "fail" means the unknown user is an imposter, who is not who he/she claims to be.

The use of passwords is a common mechanism to authenticate a user. However, if the password is stolen, the user who obtains the password will gain control over the account. Even if the password has not been stolen, when the authenticated user (i.e. the device owner) temporarily leaves the computing device he/she has logged in with the password, other unauthorized users can seize the opportunity to access the computing device. This scenario is referred to as "insider attack".

When the password is at risk of being stolen, biometric authentication can be used to solve this problem. The biometric authentication method compares the biometric information of the user with the record in database, the typical biometrics features include the fingerprint, face, retina, iris, and voice, etc. Since biometric authentication uses unique biometrics for authentication, it is difficult to copy or steal the data.

However, biometric information can be highly sensitive and personal. Another potential issue with biometric authentication is that, once a system has been implemented, an organization may be tempted to use the system for functions beyond its original specified purposes, which is known as function creep. For example, a company may find the technology useful for employee monitoring and management, and once a biometric system has been installed, the organization may easy access to locating exactly where an employee is or has been.

In addition, using a password or biometrics to authenticate the user's identity is usually performed for one-time only. Even if a repeated authentication is required, there will be a certain period of interval, otherwise it will bring additional trouble to the user. In other words, the existing user identity authentication methods are neither "continuous" nor "non-intrusive".

SUMMARY

According to an embodiment of the present disclosure, a touch-based method for user authentication, comprising: a training stage, comprising: generating a plurality of training touch parameters by a touch interface; and generating a training heat map according to the plurality of training touch parameters by a processor; and an authentication stage, comprising: generating a plurality of testing touch parameters by the touch interface; generating a testing heat map according to the plurality of testing touch parameters by the processor; comparing, by the processor, the testing heat map with the training heat map to generate an error map; and generating one of a pass signal and a fail signal according to the error map by the processor.

According to an embodiment of the present disclosure, a touch-based method for user authentication, comprising: a training stage, comprising: generating a plurality of training touch parameters by a touch interface; and training a neural network model according to the plurality of training touch parameters by a processor; and an authentication stage, comprising: generating a plurality of testing touch parameters by the touch interface; inputting, by the processor, the plurality of testing touch parameters to the neural network model to generate a predicted value; and calculating by the processor, a difference between the predicted value and an actual value to generating one of a pass signal and a fail signal.

According to an embodiment of the present disclosure, a touch-based method for user authentication, comprising: a training stage, comprising: generating a plurality of training touch parameters by a touch interface; and generating a training heat map and training a neural network model according to the plurality of training touch parameters by a processor; and an authentication stage, comprising: generating a plurality of testing touch parameters by the touch interface; generating a testing heat map according to the plurality of testing touch parameters by the processor; comparing, by the processor, the testing heat map and the training heat map to generate an error map; calculating a first error value according to the error map by the processor; inputting, by the processor, the plurality of testing touch parameters to the neural network model to generate a predicted value; and generating one of a pass signal and a fail signal according to the first error value and a second error value by the processor, wherein the second error value is associated with the predicted value and an actual value.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

The touch-based method for user authentication comprises nine embodiments, wherein the first, second, and third embodiments adopts the heat map created by the touch operations as the authentication standard. Compared with the first embodiment, the second and third embodiments increase the updating mechanism for the authentication standard, but the execution orders of the updating mechanism in the second and third embodiments are different. The fourth, fifth, and sixth embodiments adopts the neural network model trained by the touch operations as the authentication standard. Compared with the fourth embodiment, the fifth and sixth embodiments increase the updating mechanism for the authentication standard, but the execution orders of the updating mechanism in the fifth and sixth embodiments are different. The seventh, eighth, and ninth embodiments adopts both the heat map and the neural network model as the authentication standards. Compared with the seventh embodiment, the eighth and ninth embodiments increase the updating mechanism for the authentication standard, but the execution orders of the updating mechanism in the eighth and ninth embodiments are different.

Figure 1:
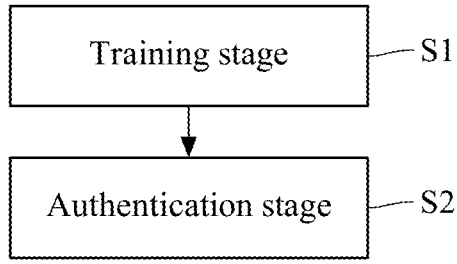
FIG. 1 is a flow chart of a touch-based method for user authentication based on touch operation according to the first embodiment of the present disclosure.

FIG. 1 is a flow chart of a touch-based method for user authentication according to the first embodiment of the present disclosure, wherein the definition of the touch operation could be any operation performed by the user in a specific area, the type of touch operation may comprise at least one of moving, pressing (along with releasing later), and scrolling, however, the present disclosure is not limited thereto. As shown in FIG. 1, the touch-based method for user authentication comprises a training stage S1 and an authentication stage S2, and is applicable to a computing device with a touch interface and a processor. The computing device may be, for example, a laptop computer or smartphone. The touch interface may be, for example, a physical touch panel or touch screen. In an embodiment, the touch interface may be composed of a physical device and a display interface, such as the mouse and monitor displaying the cursor, the motion sensor and projector projecting the sensed motion onto a flat surface, a camera device and an application converting the captured motions into movement tracks. However, the present disclosure is not limited in the above examples. Any software or hardware device that allows the user to control the movement of the identifier (such as a cursor) within a specified range shall be applied to the present disclosure.

Figure 2:
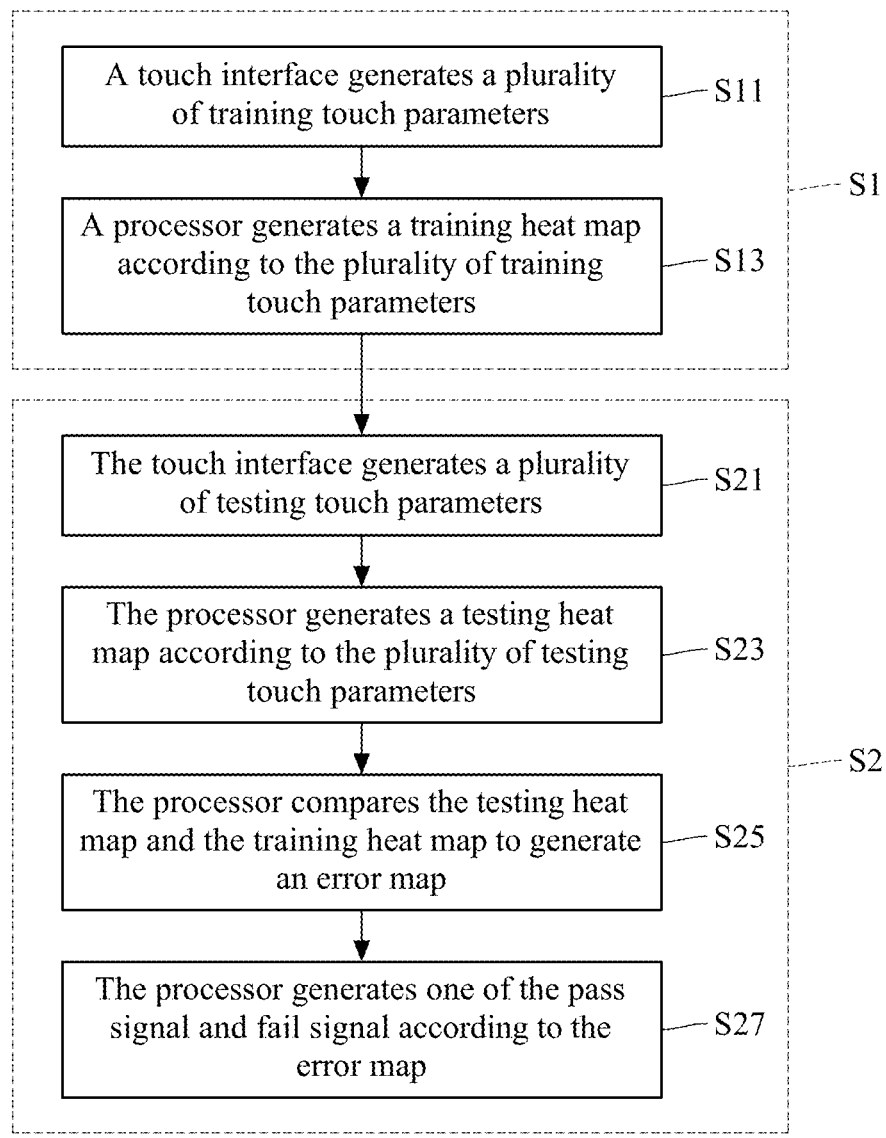
FIG. 2 is a detailed flow chart of steps in FIG. 1.

FIG. 2 is a detailed flow chart of steps in FIG. 1. As shown in FIG. 2, the training stage S1 comprises Step S11 and Step S13, and the authentication stage S2 comprises Step S25 and Step S27. The training stage S1 is used to collect the training data of multiple touch operations generated by a specific user through a touch interface, and summarize a behavior pattern of the specific user. The authentication stage S2 is used to collect the testing data of multiple touch operations generated by a current user through the touch interface, and determine whether a behavior pattern corresponding to the testing data is similar to the behavior pattern generated in the training stage S1.

In the training stage S1, Step S11 represents "A touch interface generates a plurality of training touch parameters", Step S13 represents "A processor generates a training heat map according to the plurality of training touch parameters", Step S21 represents "The touch interface generates a plurality of testing touch parameters", Step S23 represents "The processor generates a testing heat map according to the plurality of testing touch parameters", Step S25 represents "The processor compares the testing heat map and the training heat map to generate an error map", and Step S27 represents "The processor generates one of the pass signal and fail signal according to the error map".

In Step S21 and Step S22, the content of each of the training touch parameter and testing touch parameter may comprise: a touch timing, a touch location and a touch type. With the software development Kit (SDK), the processor may access the log of the touch operation as illustrated in the following Table 1.

TABLE 1

(log file of the touch operations)

| Touch timing | | Touch type | Touch location |
| --- | --- | --- | --- |
| 2020 Feb. 18 | 10:13:29.735389 | Move to | (1284, 568) |
| 2020 Feb. 18 | 10:13:29.735389 | Move to | (1284, 567) |
| 2020 Feb. 18 | 10:13:29.766641 | Press at | (1284, 567) |
| 2020 Feb. 18 | 10:13:29.844739 | Release at | (1284, 567) |
| 2020 Feb. 18 | 10:13:29.922846 | Move to | (1283, 567) |
| ... | ... | ... | ... |
| 2020 Feb. 18 | 10:13:59.256981 | Scrolled at | (721, 454) |

Figure 3:
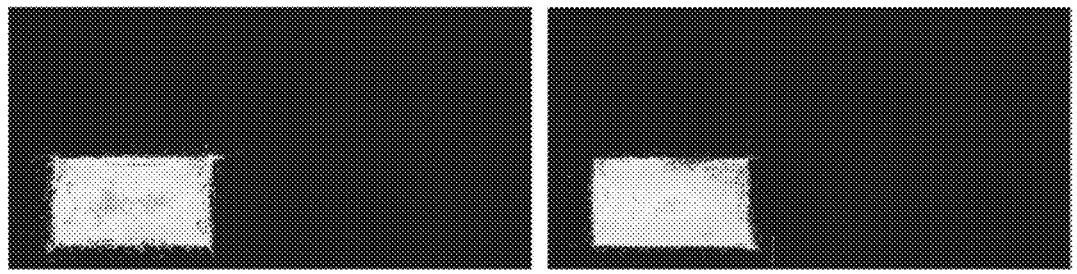
FIG. 3 shows location heat maps of two difference users based on moving operations.
Figure 4:
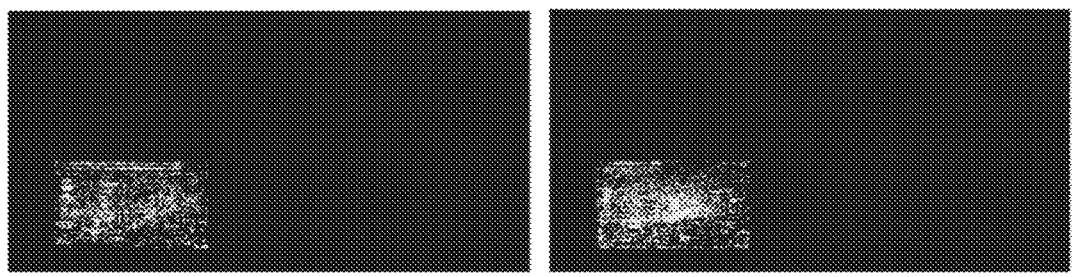
FIG. 4 shows location heat maps of two difference users based on pressing operations.
Figure 5:
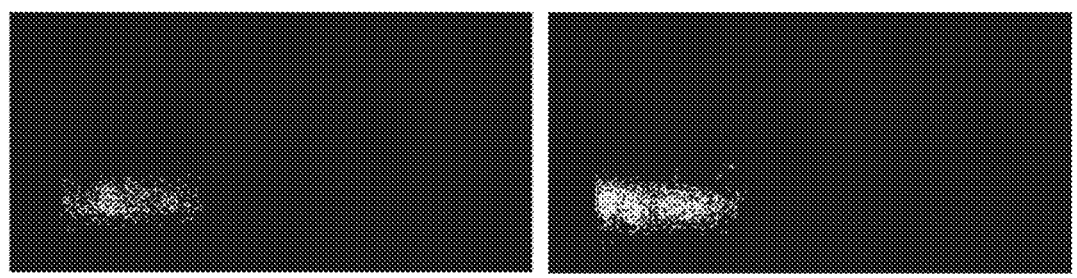
FIG. 5 shows location heat maps of two difference users based on scrolling operations.

In Step S13 and Step S23, each of the training heat map and the testing heat map comprises at least one of the location heat map and the velocity heat map. The location heat map reflects the cumulative number of touch locations, and the processor generates multiple location heat maps corresponding to different types of touch operations, as shown in FIG. 3, FIG. 4, and FIG. 5. FIG. 3 shows location heat maps of two difference users based on moving operations, FIG. 4 shows location heat maps of said two users based on pressing operations, and FIG. 5 shows location heat maps of said two difference users based on scrolling operations.

Figure 6:
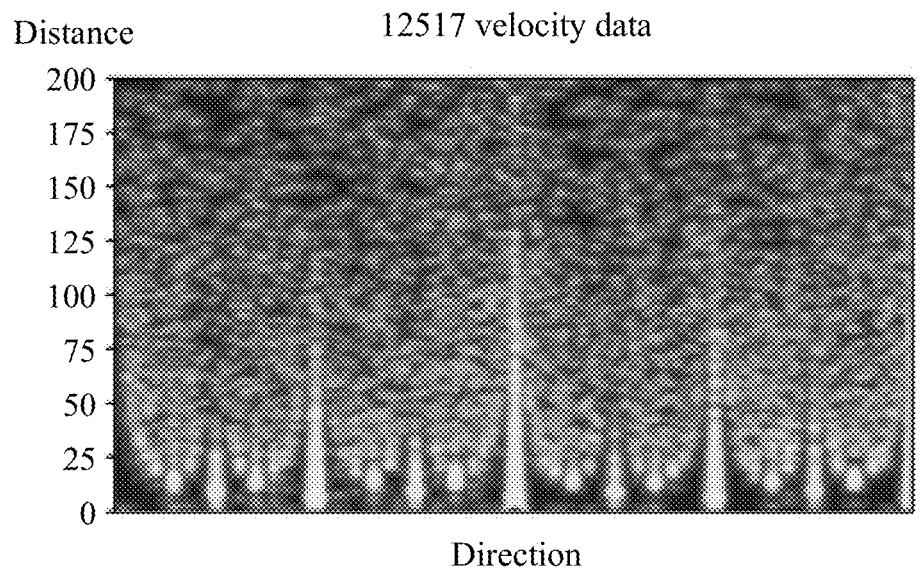
FIG. 6 shows a location heat map and a velocity heat map of the same user based on moving operations.

FIG. 6 shows a location heat map and a velocity heat map of the same user based on moving operations, wherein the velocity heat map reflects the direction and the distance of the moving operation. In an embodiment, the processor first calculates a plurality of velocity vector and then generates the velocity heat map, wherein each velocity vector is composed of two consecutive moving operations. In the velocity heat map on the right of FIG. 6, the horizontal axis is the direction of the moving operation, and the unit may be, for example, radian. The vertical axis is the distance of the moving operation, and the unit may be, for example, pixels. For example, a moving operation takes three milliseconds to move from the coordinate (0, 0) to the coordinate (6, 12), wherein the velocity of this moving operation is $2\sqrt{5}$ pixels per millisecond, and the component of this moving operation on the X axis is 2 pixels, the component on the Y axis is 4 pixels, and the angle of this moving operation is about 1.10714872 radians.

Step S25 is mainly to apply a template matching technique. Specifically, the processor compares the training heat map with the testing heat map to generate the error map, wherein the types of the training heat map and the testing heat map used for the comparison must be the same, for example, both are location heat maps or both are the velocity heat maps. In the first example of Step S25, the accuracy of comparison may be, for example, at least one of pixel-scale and patch-scale. The example of the comparison based on pixel-scale is to calculate the difference between the grayscale values of the pixels in the same location of the training heat map and the testing heat map. The example of the comparison based on patch-scale is to calculate the structural similarity index measure (SSIM). In the second example of Step S25, the processor first divides the training heat map and the testing heat map into a plurality of eigenspaces respectively, then performs rotation operation to each eigenspace, and then uses the method described in the first example, randomly select one eigenspace of the training heat map and one eigenspace of the testing heat map for the comparison. The second example can find the same touch pattern of the same user at different touch locations.

In an extended embodiment based on FIG. 2, the processor further collects the currently executing process in the training stage S1 and the authentication stage S2, such as the application (e.g. Microsoft Word, Google Chrome, etc.) of the foreground window in the operating system, and generates corresponding training heat map and testing heat map according to the currently executing process. Therefore, when the processor performs the comparison between the training heat map and the testing heat map, in addition to the types of the two heat maps must be the same, the corresponding executing processes of the two heat maps must also be the same.

It should be noted that the processor may generate multiple training heat maps in Step S13 according to multiple touch types or multiple processes, and the processor generates multiple testing heat maps corresponding to multiple training heat maps in Step 23. Therefore, the processor generates a plurality of error maps in Step S25, and the present disclosure does not limit the upper limit of the number of error maps.

In Step S27, the processor calculates one or more error values according to one error map, and compares each error value with its corresponding threshold. If the number of the error values exceeding a threshold is greater than a default value, the processor generates a fail signal. On the other hand, if the number of the error values exceeding the threshold is not greater than the default value, the processor generates a pass signal.

Figure 7:
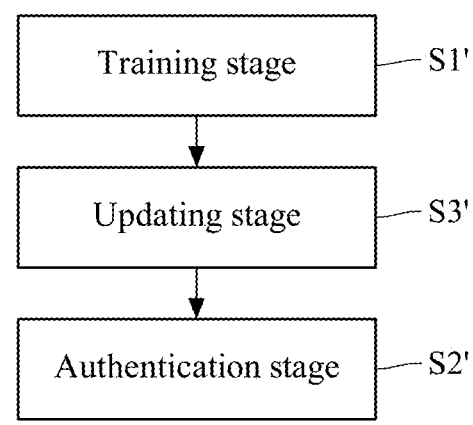
FIG. 7 is a flow chart of a touch-based method for user authentication based on touch operation according to the second embodiment of the present disclosure.
Figure 8:
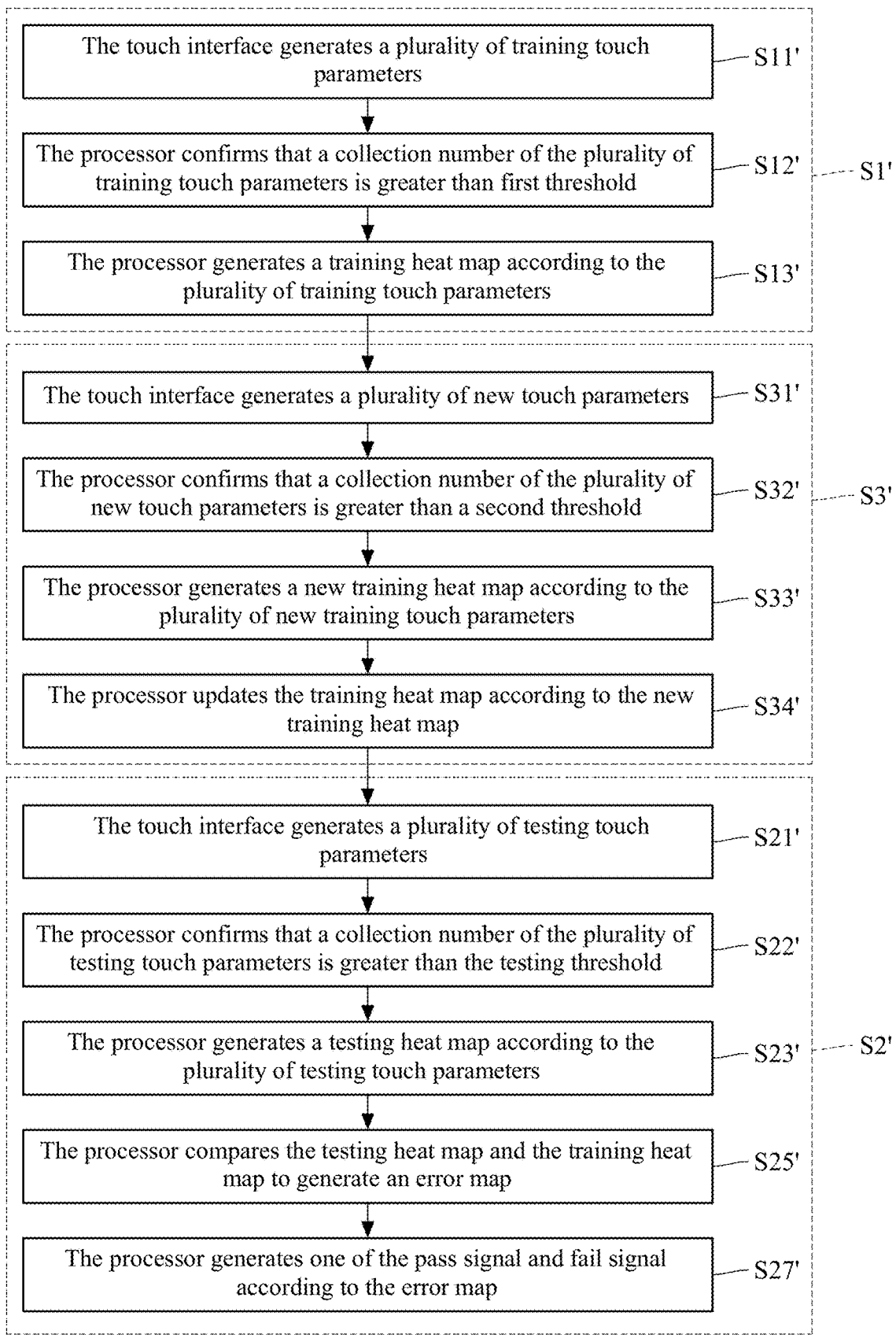
FIG. 8 is a detailed flow chart of steps in FIG. 7.

FIG. 7 is a flow chart of a touch-based method for user authentication according to the second embodiment of the present disclosure. Compared to the first embodiment, the second embodiment mainly adds an updating stage S3'. FIG. 8 is a detailed flow chart of steps in FIG. 7. As shown in FIG. 8, the training stage S1' of the second embodiment has a step S12' more than the training stage S1 of the first embodiment, and the authentication stage S2' of the second embodiment has a step S22' more than the authentication stage S2 of the first embodiment. Only the newly added steps of the second embodiment will be described below, and the same steps in the second embodiment and the first embodiment will not be repeated.

Step S12' represents "The processor confirms that a collection number of the plurality of training touch parameters is greater than first threshold". Step S22' represents "The processor confirms that a collection number of the plurality of testing touch parameters is greater than the testing threshold". The collection number may be at least one of the time interval (such as 72 hours) and the number of parameters (such as one hundred thousand touch parameters). After the touch parameters are collected in step S11' and step S21', the determination mechanism of step S12' and step S22' needs to be satisfied before entering step S13' and step S23', respectively.

Please refer to FIG. 7 and FIG. 8. In the second embodiment, the updating stage S3' is in the middle of the training stage S1' and the authentication stage S2'. Step S31' represents "The touch interface generates a plurality of new touch parameters", Step S32' represents "The processor confirms that a collection number of the plurality of new touch parameters is greater than a second threshold", Step S33' represents "The processor generates a new training heat map according to the plurality of new training touch parameters", and Step S34' represents "The processor updates the training heat map according to the new training heat map". Basically, steps S31'-S33' in the updating stage S3' are identical to steps S11'-S13' in the training stage S1. In addition, the present disclosure does not limit the first threshold of step S12', the second threshold of step S32', and the testing threshold of step S22'.

In step S34', the processor calculates a difference between the new training heat map and the training heat map. When the difference is smaller than an updating threshold, the processor generates another new training heat map according to the training parameters collected in Step S11' and new training parameters collected in Step S31'. When the difference is not smaller than the updating threshold, the processor replace the training heat map generated in Step S13' with the new training heat map generated in Step S33'.

In general, since the user's touch pattern may change with time or the current executing process, the second embodiment first collects a set of touch parameters to initialize a training heat map for reference, and then collects another set of touch parameters for updating the original training heat map.

Figure 9:
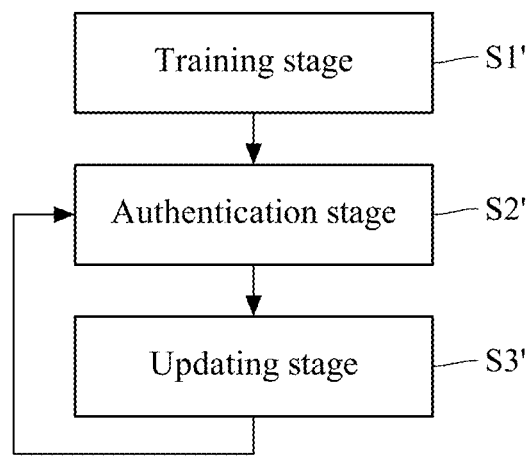
FIG. 9 is a flow chart of a touch-based method for user authentication according to the third embodiment of the present disclosure.

FIG. 9 is a flow chart of a touch-based method for user authentication according to the third embodiment of the present disclosure. The training stage S1' and the authentication stage S2' are basically identical to that of the second embodiment. In other words, the third embodiment is equivalent to adding Step S12' and Step S22' to the first embodiment, and adding an updating stage S3' after the authentication stage S2'. In other words, the third embodiment is based on the second embodiment and moves the updating stage S3' to after the authentication stage S2'.

The application method of the third embodiment is as follows: a user generates his own training heat map in the training stage S1', and he/she may verify the authentication accuracy of the training heat map through the testing heat map in the authentication stage S2'. The accuracy rate is fed back to the update stage S3', so as to correct the second threshold in step S32'. For example, if the accuracy of step S27' is smaller than a certain value in the authentication stage S2', the processor will increase the second threshold in step S32' to collect more new touch parameters, so as to improve the accuracy rate when performing authentication stage S2' for the next time.

In the second embodiment and the third embodiment, the updating stage S3 may update the touch parameter periodically to reflect the time-variance of the user's touch pattern, wherein the update mechanism is as following Equation 1:

$$TP = TP_{new} \times w_1 + TP_{current} \times w_2, \quad \text{(Equation 1)}$$

where TP denotes the updated touch parameter, $TP_{new}$ denotes new touch parameters described in step S31', $TP_{current}$ denotes touch parameters described in Step S11', and $w_1$ and $w_2$ denote weightings.

Figure 10:
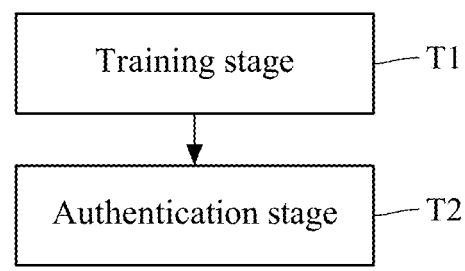
FIG. 10 is a flow chart of a touch-based method for user authentication according to the fourth embodiment of the present disclosure.
Figure 11:
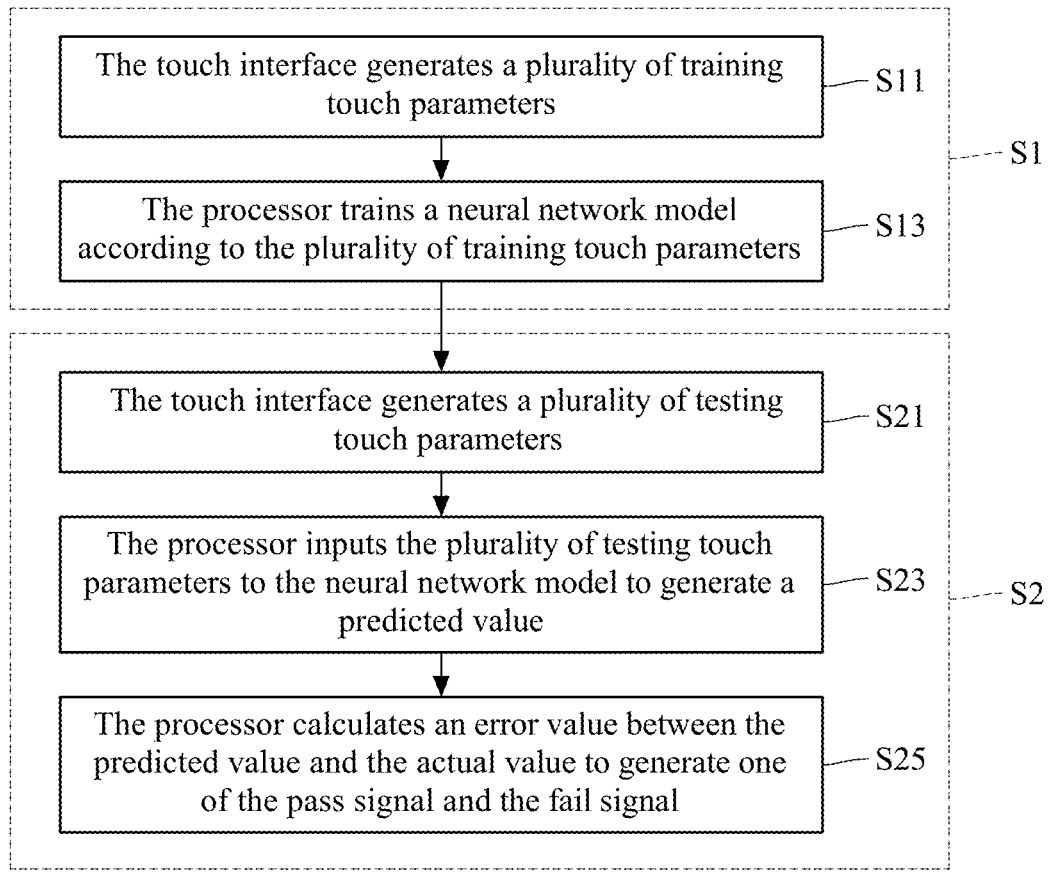
FIG. 11 is a detailed flow chart of steps in FIG. 10.

FIG. 10 is a flow chart of a touch-based method for user authentication according to the fourth embodiment of the present disclosure, and FIG. 11 is a detailed flow chart of steps in FIG. 10. Step T11 represents "The touch interface generates a plurality of training touch parameters", Step T13 represents "The processor trains a neural network model according to the plurality of training touch parameters", Step T21 represents "The touch interface generates a plurality of testing touch parameters", Step T23 represents "The processor inputs the plurality of testing touch parameters to the neural network model to generate a predicted value", and Step T25 represents "The processor calculates an error value between the predicted value and the actual value to generate one of the pass signal and the fail signal"

The main difference between the fourth embodiment and the first embodiment lies in that the fourth embodiment comprises Step T13 of the training stage T1 and steps T23, T25 of the authentication stage T2. Therefore, only the details of these different steps T13, T23, and T25 will be described below, and the same steps in the fourth embodiment and the first embodiment will not be repeated.

In Step T13, the processor converts the plurality of training touching parameters into a time series, and then inputs the time series to the neural network model as the input layer for training, so as to obtain a prediction model for predicting a subsequent time-series. The neural network model may be, for example, the Long Short-Term Memory (LSTM) model. In addition, a plurality of prediction models may be trained according to different touch types of touch parameters.

The generation of the time-series may include, but is not limited to, the following three methods:

1. The time-series is composed of a timing and location of each moving operation;

2. The time-series is composed of a start timing (or end timing) and a velocity vector, wherein the processor selects two from multiple consecutive moving operations according to a fixed time interval and uses said two moving operations to calculate the velocity vector. Since the velocity vector is a two-dimensional vector, the time-series generated by the above method is a multivariate time-series; and 3. The time-series is composed of one or more centroid of each training heat map and a corresponding timing of each training heat map. For example, the processor divides the plurality of training touch parameters into multiple groups according to the time sequence, generates one training heat map for each group, and then calculate the centroid of each training heat map, wherein the centroid is computed by K-means.

In Step T23, the processor may input a set of testing touch signals to the prediction model generated in Step T13 to obtain a set of predicted values, the set of predicted values may comprise one or more testing touch parameters.

The first example of Step T25 adopts an anomaly detection mechanism of the time-series, which is explained by the following document:

"H Nguyen, Kim Phuc Tran, S Thomassey, M Hamad. Forecasting and Anomaly Detection approaches using LSTM and LSTM Autoencoder techniques with the applications in Supply Chain Management. International Journal of Information Management, Elsevier, 2020."

Here is the description of the anomaly detection mechanism: The next-time touch parameters, such as the location, may be predicted by the LSTM model. If the actual location is too far from the predicted location, this actual location will be viewed as an anomaly. The norm as the authentication standard may be learned by using the auto-encoder, such as the LSTM encoder or image auto-encoder. The auto-encoder is considered as a feature extractor no matter the input to the auto-encoder is a still image, heat map, time-series or multivariate time-series/heat map. In the case of location heat map, the norm represents the commonly-used area of the touchpad in a reduced dimension or in an embedded space. In the authentication stage S2, the testing heat map will be fed into the auto-encoder and be reconstructed. Once the difference between the testing heat map and the reconstructed heat map is too large, this testing heat map is considered an anomaly.

The second example of Step S25 is described as follows. The processor obtains another set of testing touch signals whose time sequence is later than that of the set of testing touch signals described in Step S23, and said other set of testing touch signals are set as a set of actual values. The processor calculates an error value between each of the set of actual values and its corresponding predicted value, and compares the error value with it corresponding threshold. If a number of error values exceeding the threshold is greater than a specific value, the processor generates a fail signal. On the other hand, if a number of error values exceeding the threshold is not greater than the specific value, the processor generates a pass signal.

Figure 12:
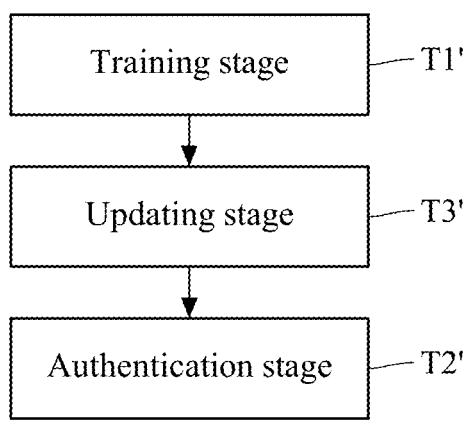
FIG. 12 is a flow chart of a touch-based method for user authentication according to the fifth embodiment of the present disclosure.
Figure 13:
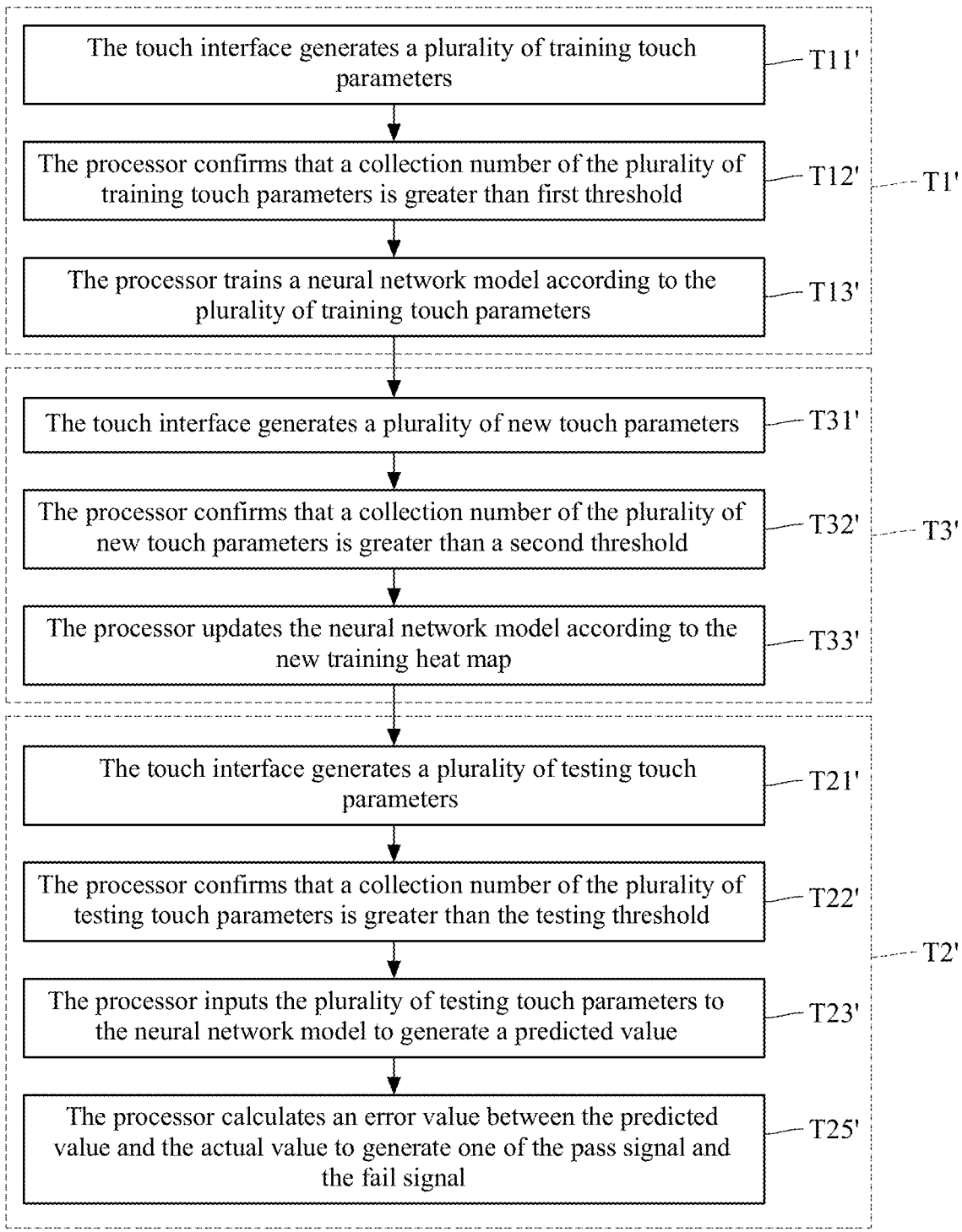
FIG. 13 is a detailed flow chart of steps in FIG. 12.

FIG. 12 is a flow chart of a touch-based method for user authentication according to the fifth embodiment of the present disclosure. Compared to the fourth embodiment, the fifth embodiment mainly adds an updating stage S3'. FIG. 13 is a detailed flow chart of steps in FIG. 12. As shown in FIG. 13, the training stage T1' of the fifth embodiment has a step T12' more than the training stage T1 of the fourth embodiment, and the authentication stage T2' of the fifth embodiment has a step T22' more than the authentication stage T2 of the fourth embodiment. Since Step T12' and Step T22' are basically identical to Step S12' and Step S22', similar/identical steps in the fifth embodiment and the previous embodiments will not be repeated here for brevity. In addition, the structure of the updating stage T3' of the fifth embodiment is similar to that of the updating stage S3' of the second embodiment, where the difference is that Step T33' represents "The processor updates the neural network model according to new training touch parameters", and Step S33 represents "The processor updates the training heat map according to the new training touch parameters". In sum, these two embodiments use new training touch parameters to update different authentication standard.

Figure 14:
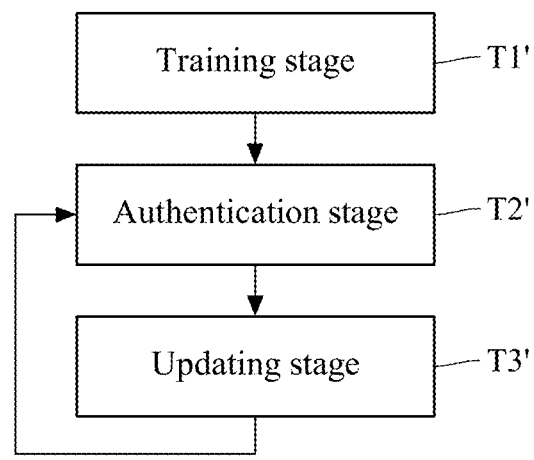
FIG. 14 is a flow chart of a touch-based method for user authentication according to the sixth embodiment of the present disclosure.

FIG. 14 is a flow chart of a touch-based method for user authentication according to the sixth embodiment of the present disclosure. The sixth embodiment and the fifth embodiment have the same training stage T1' and authentication stage T2'. In other words, the sixth embodiment is based on the fifth embodiment and moves the order of the updating phase T3' to after the authentication phase T2'.

Figure 15:
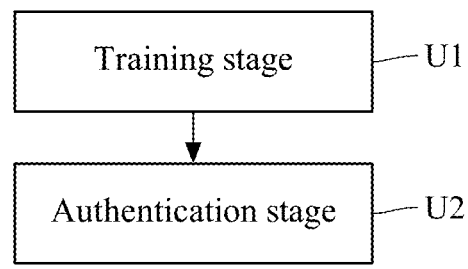
FIG. 15 is a flow chart of a touch-based method for user authentication according to the seventh embodiment of the present disclosure.
Figure 16:
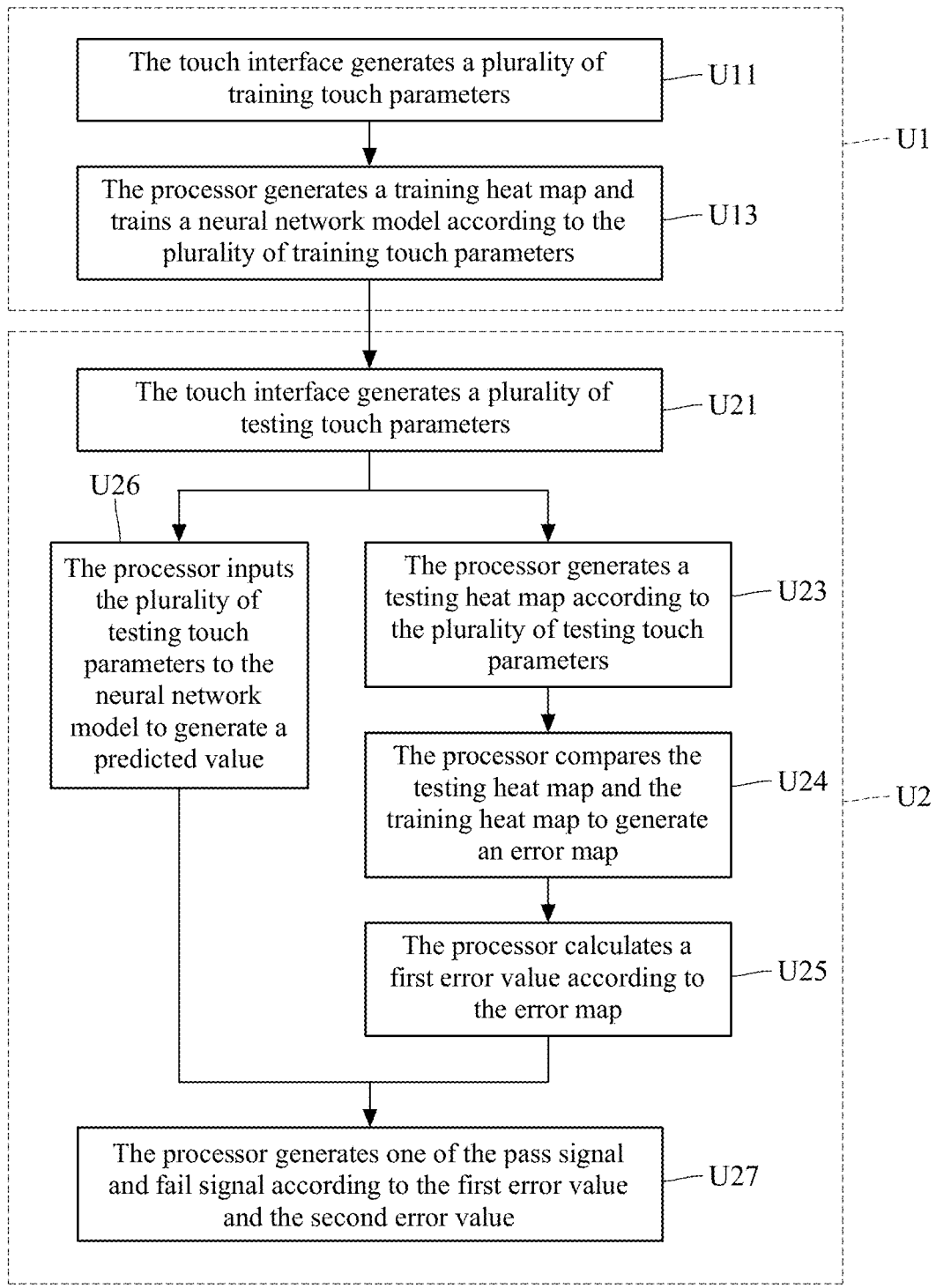
FIG. 16 is a detailed flow chart of steps in FIG. 15.

FIG. 15 is a flow chart of a touch-based method for user authentication according to the seventh embodiment of the present disclosure, and the method comprises a training stage U1 and the authentication stage U2. FIG. 16 is a detailed flow chart of steps in FIG. 15. The training stage U1 comprises Step U11 and Step U13, and the authentication stage U2 comprises steps U21, U23, U24, U25, U26, and U27.

Step U11 represents "the touch interface generates a plurality of training touch parameters", Step U13 represents "the processor generates a training heat map and trains a neural network model according to the plurality of training touch parameters", Step U21 represents "the touch interface generates a plurality of testing touch parameters", Step U23 represents "the processor generates a testing heat map according to the plurality of testing touch parameters", Step U24 represents "the processor compares the testing heat map and the training heat map to generate an error map", Step U25 represents "the processor calculates a first error value according to the error map", Step U26 represents "the processor inputs the plurality of testing touch parameters to the neural network model to generate a predicted value", Step U27 represents "the processor generates one of the pass signal and fail signal according to the first error value and the second error value". It can be seen from the above content that the seventh embodiment integrates the first embodiment and the fourth embodiment, and uses both the training heat map and the neural network model concurrently for user authentication.

Figure 17:
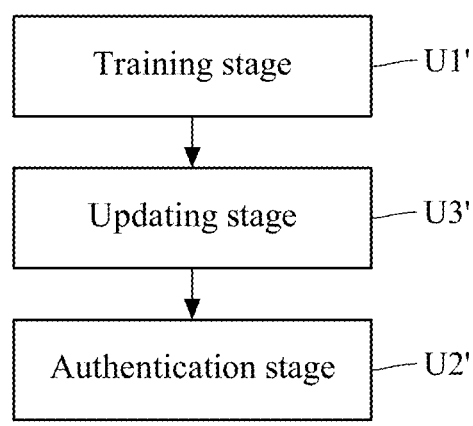
FIG. 17 is a flow chart of a touch-based method for user authentication according to the eighth embodiment of the present disclosure.
Figure 18A:
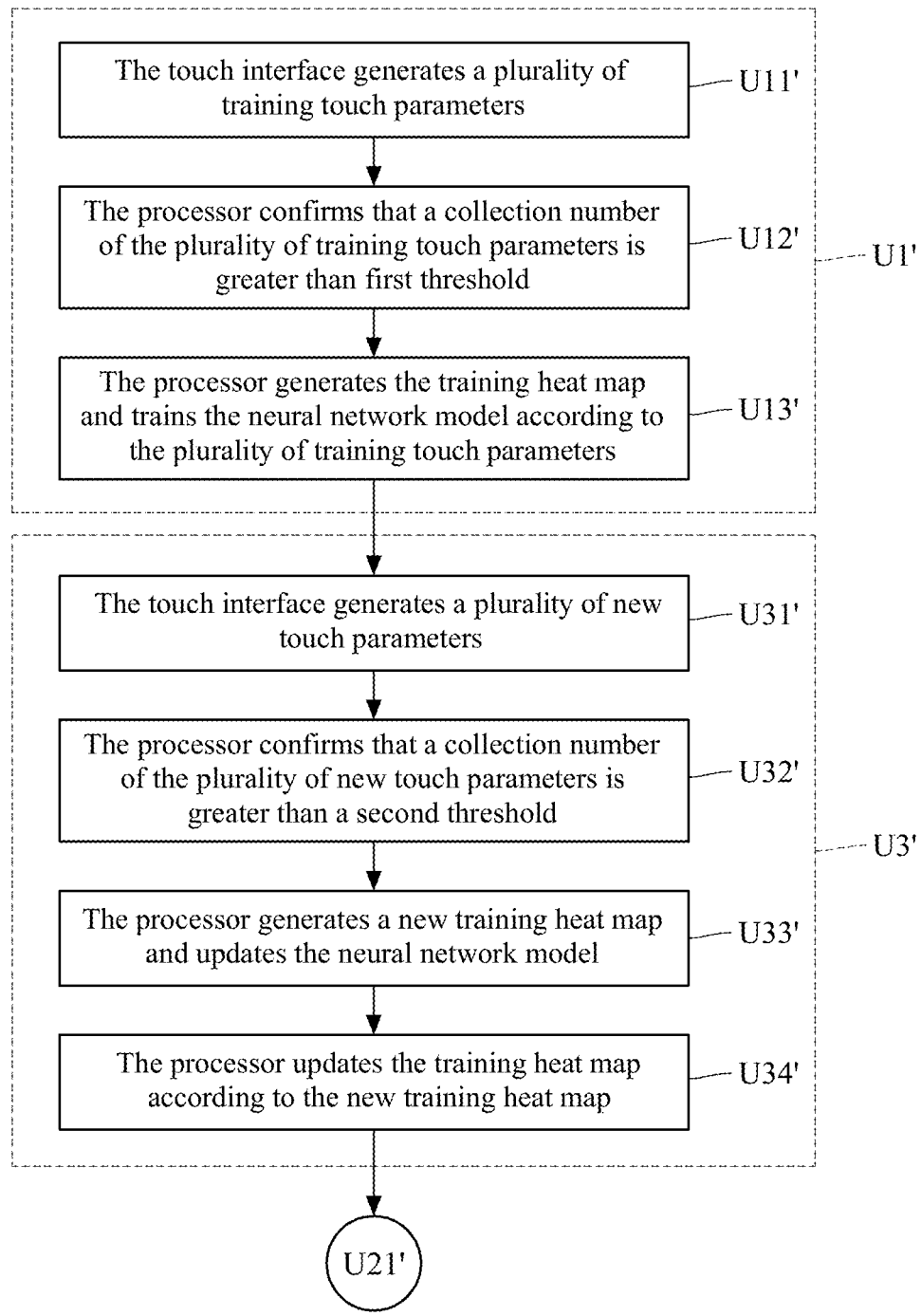
FIG. 18A and FIG. 18B are detailed flow charts of steps in FIG. 17.
Figure 18B:
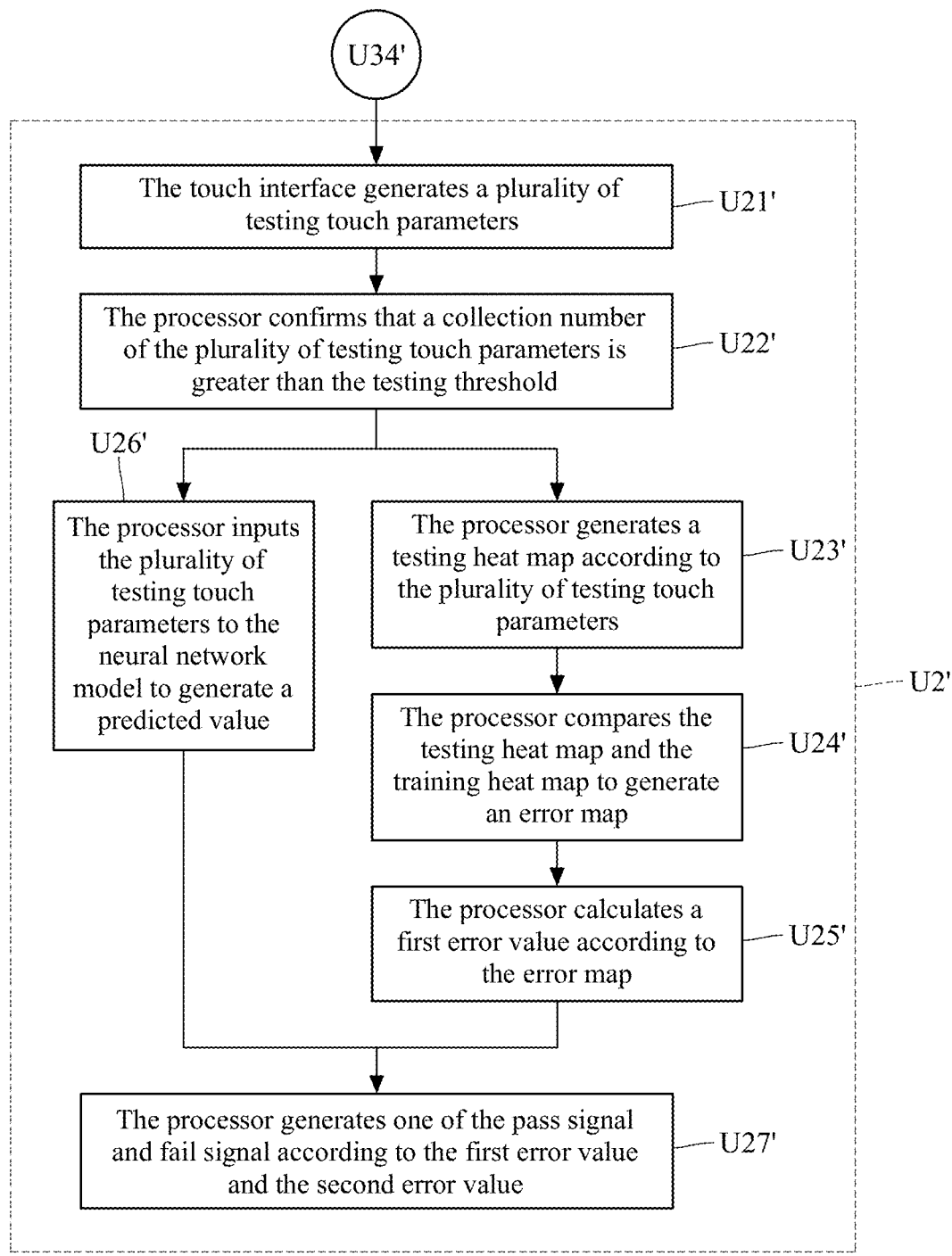

FIG. 17 is a flow chart of a touch-based method for user authentication according to the eighth embodiment of the present disclosure. Compared to the seventh embodiment, the eighth embodiment mainly adds an updating stage U3'. FIG. 18A and FIG. 18B are detailed flow charts of steps in FIG. 17. As shown in FIG. 18A and FIG. 18B, the training stage U1' of the eighth embodiment has a Step U12' more than the training stage U1 of the seventh embodiment, and the authentication stage U2' of the eighth embodiment has a Step U22' more than the authentication stage U2 of the seventh embodiment. Identical/similar steps in the eighth embodiment and the seventh embodiments will not be repeated here. In addition, the eighth embodiment is equivalent to an integration of the second embodiment and the fifth embodiment. In other words, steps U23' and U24' are equivalent to steps S23' and S25', Step U26 is equivalent to Step T26'. The eighth embodiment adds Step U25' and Step U27' according to the requirement of the integration. In Step U25', the processor calculates a first error value according to the error map. In Step U27' the processor generates one of the pass signal and fail signal according to the first error value and the second error value, wherein the second error value is associated with the predicted value obtained in step S26' and the actual value extracted in Step U23'. The details of predicted value, actual value, and the second error value may refer to the paragraph of error value calculation in Step T27. The processor may, for example, calculate a weighted average of the first error value and the second error value and determines whether the weighted average is greater than a threshold, and outputs the pass signal or the fail signal accordingly.

In addition, the updating stage U3' of the eighth embodiment is equivalent to the integration of Step S3' of the second embodiment and Step T3' of the fifth embodiment. In other words, in Step U33', the processor not only generates a new training heat map according to the new training touch parameters, but updates the neural network model according to the new training touch parameters. In sum, the processor integrated two different authentication standards.

Figure 19:
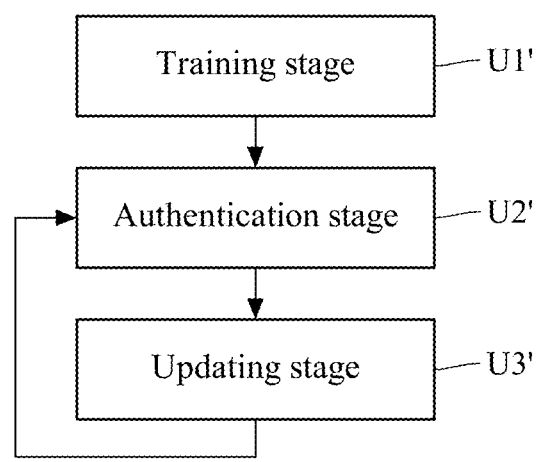
FIG. 19 is a flow chart of a touch-based method for user authentication according to the ninth embodiment of the present disclosure.

FIG. 19 is a flow chart of a touch-based method for user authentication according to the ninth embodiment of the present disclosure. The eighth embodiment and the ninth embodiment basically have the same training stages U1' and the authentication stages U2'. In other words, the ninth embodiment is based on the eighth embodiment, and moves the order of the updating stage U3' to after the authentication stage U2'.

In the seventh, eighth, and ninth embodiment, the present disclosure not only uses the template matching technique to perform the comparison the training heat map and the testing heat map, but also adds an Artificial Intelligence (AI) technique to provide an additional authentication standard for user's unique touch pattern.

The present disclosure provides a touch-based method for user authentication based on touch operation. This method authenticates an user continuously and non-intrusively by observing his/her pattern of touch operations. If the touch pattern of new user deviates a lot from that of the intended original user, this unknown user is identified as a potential imposter and his/her access operation will be prohibited immediately. The method proposed by the present disclosure may be called "TouchPrint", since the usage dynamics of touch operations can authenticate the user's identity like a fingerprint.

In view of the above, the present disclosure has the following contributions or effects:

1. The proposed method "continuously" and "non-intrusively" monitors and authenticates the current user.
2. The proposed method is data-driven and is adaptive to the changing user touchpad usage patterns.
3. The proposed method improves the frequency of user identity authentication, and performs the authentication at a time when the existing user identity authentication mechanism (such as password or biometrics) is not performed.

It should be noted that the proposed method does not mean to replace or retire the existing authentication mechanism, but is to supplement and enhance the security of the computing device, and avoid the insider attack. In other words, the present disclosure can detect the imposter even when the computing device is currently unlocked.

What is claimed is:

1. A touch-based method for user authentication, comprising:
   a training stage, comprising:
      generating a plurality of training touch parameters by a touch interface; and
      generating a training heat map and training a neural network model according to the plurality of training touch parameters by a processor; and an authentication stage, comprising:
  generating a plurality of testing touch parameters by the touch interface;
  generating a testing heat map according to the plurality of testing touch parameters by the processor;
  comparing, by the processor, the testing heat map and the training heat map to generate an error map;
  calculating a first error value according to the error map by the processor;
  inputting, by the processor, the plurality of testing touch parameters to the neural network model to generate a predicted value; and
  generating one of a pass signal and a fail signal according to the first error value and a second error value by the processor, wherein the second error value is associated with the predicted value and an actual value.

2. The method according to claim 1, wherein each of the training heat map and the testing heat map comprises at least one of a location heat map and a velocity heat map, the location heat map reflects a cumulative number of touch locations, and the velocity heat map reflects a direction and a distance of a moving operation.

3. The method according to claim 1, wherein:
the training stage further comprises confirming that a collection number of the plurality of training touch parameters is greater than a first threshold by the processor before the processor generates the training heat map and trains the neural network model;
the authentication stage further comprises confirming that a collection number of the plurality of testing touch parameters is greater than a testing threshold before the processor generates the training heat map and trains the neural network model; and
the method further comprises an updating stage, and the updating stage comprises:
generating a plurality of new touch parameters by the touch interface;
confirming that a collection number of the plurality of new touch parameters is greater than a second threshold by the processor;
generating, by the processor, a new training heat map and updating the neural network model;
updating the training heat map according to the new training heat map.

* * * * *